J. GATES.

LUBRICATOR.

No. 7,662. Reissued May 8, 1877.

Witnesses;

Harry C Clark

Mamie Stallings.

Inventor.

John Gates.

by H. W. Beadle Co.

Att'ys.

N. PETERS, Photo-Lithographer, Washington, D. C.

UNITED STATES PATENT OFFICE.

JOHN GATES, OF PORTLAND, OREGON.

IMPROVEMENT IN LUBRICATORS.

Specification forming part of Letters Patent No. 107,478, dated September 20, 1870; Reissue No. 7,662, dated May 8, 1877; application filed November 23, 1876.

DIVISION B.

*To all whom it may concern:*

Be it known that I, JOHN GATES, of Portland, county of Multnomah, State of Oregon, have invented new and useful Improvements in Methods of and Apparatus for Feeding Oil for Lubricating Purposes, which improvements are fully set forth in the following specification and the accompanying drawings.

This invention is designed for feeding oil for lubricating purposes; and it consists, mainly, first, in an improved method of feeding, consisting, essentially, in the employment, in connection with a boiler or steam-space, of a water-column extending above the body of oil, and formed from the condensation of steam, for expelling, by its hydrostatic pressure, oil into a cylinder or like steam-space, to be supplied with lubricating material; and, second, in certain means for carrying my invention practically into effect, consisting, essentially, in the combination, with a boiler or steam space, of an elevated condensing-pipe having a regulating-cock, an oil-reservoir, and an eduction-pipe discharging into the cylinder or steam-space, to be supplied with lubricating material.

Figure 1:
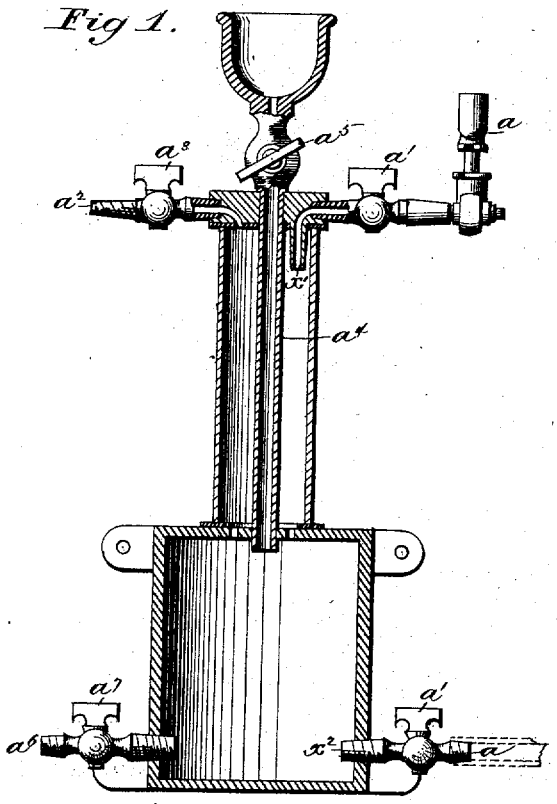
Figure 2:
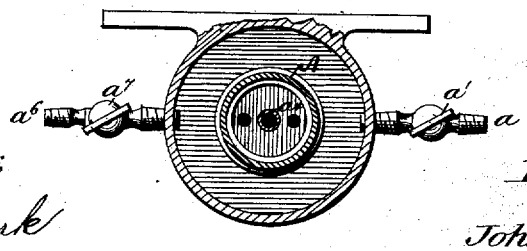

In the drawings, Figure 1 represents a central sectional elevation of the improved lubricator, by means of which my method is carried practically into effect; and Fig. 2, a horizontal section of the same, taken on the line *x x*, Fig. 1.

To enable others skilled in the art to understand my method and to make and use my improved lubricator for carrying it practically into effect, I will proceed fully to describe them both.

In the drawings, A represents an oil-vessel of any proper construction. *a* represents an induction-pipe communicating with the steam-boiler or any steam-space connected therewith, which pipe is of such construction and arrangement that a column of water will be furnished by condensation of sufficient height to raise and deliver the oil to the part to be lubricated.

If desired, the pipe *a* may discharge into the top of the oil-vessel, as shown at $x'$, or into the bottom, as shown at $x^2$, or at both points, as shown.

$a'$ represents a regulating-cock, by means of which the inflow of water from pipe *a* is controlled.

$a^2$ represents an oil-eduction pipe leading to the steam-space to be lubricated.

$a^3$ represents a cock, which may be employed, if desired, to control the discharge.

$a^4$ represents a pipe having the cock $a^5$, by means of which the reservoir may be filled with oil.

$a^6$ represents a waste-pipe having a cock, $a^7$, by means of which the reservoir may be emptied when it becomes filled with water.

The method of operation will be readily understood.

The reservoir having been properly supplied with oil, the same may be discharged in proper quantities through the oil-eduction pipe by opening the cock $a'$, in consequence of which the hydrostatic pressure of the water-column is brought to bear upon the oil, and the same, of course, is expelled to the part to be lubricated.

The amount of oil discharged at any time will equal, of course, the amount of water admitted, so that a greater or less amount may be used by properly regulating the cock $a'$ according to the circumstances of the case.

The water-column, it will be understood, is formed and sustained by condensation in the pipe *a* communicating with the boiler or steam-space connected therewith.

Having thus fully described my invention, what I claim as new, and desire to secure by Letters Patent, is—

1. The described method of feeding oil for lubricating purposes, consisting, essentially, in the employment, in connection with a steam-space, of a water-column extending above the body of oil, and formed from the condensation of steam, for expelling, by its hydrostatic pressure, oil into a steam-space to be supplied with lubricating material, substantially as described.

2. In a lubricator, the combination, with a steam-space, of an elevated condensing-pipe having a regulating-cock, an oil-reservoir, and an eduction-pipe discharging into the steam-space to be supplied with lubricating material, substantially as described.

This specification signed and witnessed this 30th day of August, 1876.

JOHN GATES.

Witnesses:

JOSEPH SIMON,

J. N. DOLPH.